(12) United States Patent
Suzuki et al.

(10) Patent No.: US 10,744,863 B2
(45) Date of Patent: Aug. 18, 2020

(54) POWER UNIT STRUCTURE FOR ELECTRICALLY DRIVEN VEHICLE

(71) Applicant: HONDA MOTOR CO., LTD., Tokyo (JP)

(72) Inventors: Takanori Suzuki, Wako (JP); Yuya Ishihara, Wako (JP); Takuro Tominaga, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/296,641

(22) Filed: Mar. 8, 2019

(65) Prior Publication Data

US 2019/0283560 A1 Sep. 19, 2019

(30) Foreign Application Priority Data

Mar. 13, 2018 (JP) .................................. 2018-045315

(51) Int. Cl.
*B60K 1/00* (2006.01)
*H02K 11/35* (2016.01)
(Continued)

(52) U.S. Cl.
CPC ................ *B60K 1/00* (2013.01); *B60K 17/00* (2013.01); *H02K 5/10* (2013.01); *H02K 5/24* (2013.01);
(Continued)

(58) Field of Classification Search
CPC ............................ B60K 1/00; B60K 2001/001
See application file for complete search history.

(56) References Cited

U.S. PATENT DOCUMENTS

2015/0283955 A1* 10/2015 Sakamoto ............. F16B 5/0241
                                                    248/636
2017/0028849 A1*  2/2017 Sakamoto ................ B60K 1/00
(Continued)

FOREIGN PATENT DOCUMENTS

CN    107074084 A     8/2017
DE    103 56 531 A1   7/2005
(Continued)

OTHER PUBLICATIONS

"3-3-3 Motor Design (EV), Automotive Technology Handbook Design (EV/Hybrid) Ed., Japan", Automobile Engineering Association, Feb. 1, 2016, 1st edition, 1st printing, pp. 143-148, ISBN: 978-4-904056-62-2, with English translation cited in JP Office Action dated Sep. 17, 2019. (7 pages).

(Continued)

*Primary Examiner* — Brian L Swenson
(74) *Attorney, Agent, or Firm* — Westerman, Hattori, Daniels & Adrian, LLP

(57) ABSTRACT

To provide a power unit structure for an electrically driven vehicle which can decrease design man-hours, as well as raise the rigidity of the unit. A control device unit for an electrically driven vehicle includes: a first mounting part which is a mounting part of a power supply unit that supplies electric power to an electric motor, and a second mounting part which fixes the control device unit to an electric motor unit; and the control device unit is mounted from a transmission case side of the electric motor unit towards an electric motor case side, the first mounting part being mounted to a central case, and the second mounting part being mounted to the transmission case.

8 Claims, 11 Drawing Sheets

(51) Int. Cl.
*H02K 5/10* (2006.01)
*H02K 5/24* (2006.01)
*H02K 7/00* (2006.01)
*B60K 17/00* (2006.01)

(52) U.S. Cl.
CPC ............ *H02K 7/006* (2013.01); *H02K 11/35* (2016.01); *B60K 2001/001* (2013.01)

(56) References Cited

U.S. PATENT DOCUMENTS

| | | |
|---|---|---|
| 2017/0264172 A1* | 9/2017 | Meunier .................. B60K 1/00 |
| 2017/0267301 A1* | 9/2017 | Katano ............. H01M 8/04952 |
| 2017/0305253 A1 | 10/2017 | Perlo et al. |
| 2019/0020242 A1* | 1/2019 | Tomokage ............... H02K 5/04 |
| 2019/0126989 A1* | 5/2019 | Okura .................. B62D 21/152 |
| 2019/0232895 A1* | 8/2019 | Yamada ................. B62D 25/08 |
| 2019/0299772 A1* | 10/2019 | Takai ..................... B60K 11/08 |
| 2019/0344650 A1* | 11/2019 | Suumen .................. B60K 1/00 |

FOREIGN PATENT DOCUMENTS

| | | |
|---|---|---|
| JP | 2001-322439 A | 11/2001 |
| JP | 2011-20628 A | 2/2011 |
| JP | 2013-173425 A | 9/2013 |

OTHER PUBLICATIONS

Office Action dated Sep. 17, 2019, issued in counterpart JP application No. 2018-045315, with English translation. (7 pages).
Extended European Search Report dated Aug. 26, 2019, issued in counterpart EP application No. 19162073.1 (5 pages).

\* cited by examiner

FIG. 2
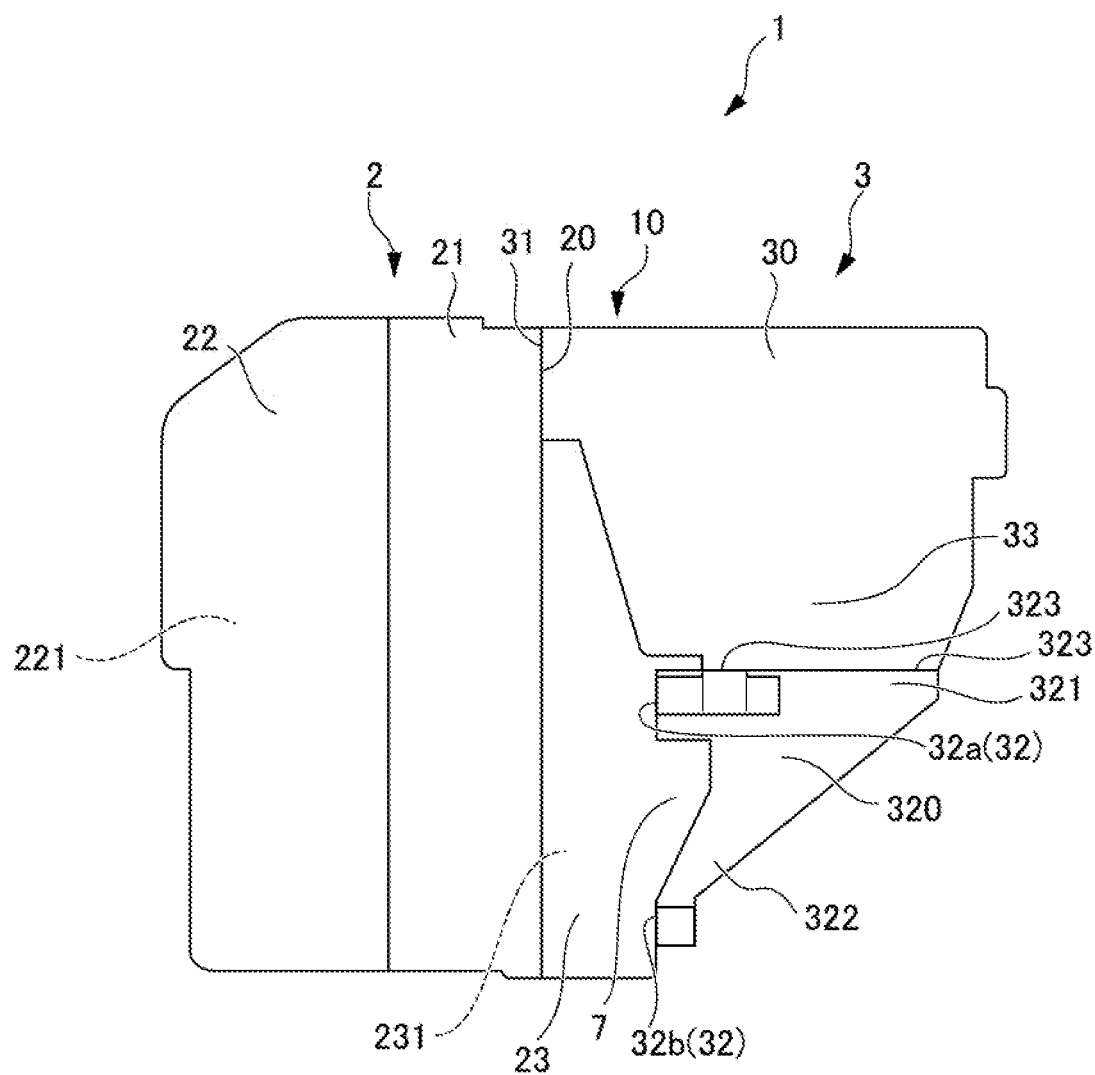
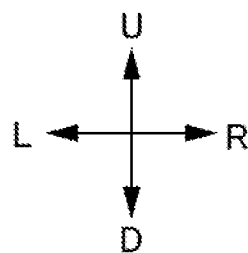

POWER UNIT STRUCTURE FOR ELECTRICALLY DRIVEN VEHICLE

This application is based on and claims the benefit of priority from Japanese Patent Application No. 2018-045315, filed on 13 Mar. 2018,the content of which is incorporated herein by reference.

BACKGROUND OF THE INVENTION

Field of the Invention

The present invention relates to a power unit structure for an electrically driven vehicle.

Related Art

Conventionally, a power unit structure of mechatronical integration type has been disclosed in which a transmission which converts the revolution of an electric motor is arranged along the axle direction between the electric motor and an inverter (control device) which performs rotation control of the electric motor (for example, refer to Patent Document 1). With this power unit structure, three-phase power lines connecting the electric motor and inverter are arranged to penetrate the transmission case.

Patent Document 1: Japanese Unexamined Patent Application, Publication No. 2013-173425

SUMMARY OF THE INVENTION

However, with the power unit structure of Patent Document 1, it is necessary to design so that each built-in gear and through hole of the three-phase power lines do not interfere, upon design of the transmission case, and thus there has been a problem in that the design man-hours increase. In addition, the electric motor, transmission and inverter are fastened linearly to line up in a row; therefore, there has been a problem in being weak to external input from a direction orthogonal to the aligning direction, and a high voltage part is exposed during vehicle collision, etc.

The present invention has been made taking account of the above, and the object thereof is to provide a power unit structure for an electrically driven vehicle which can decrease design man-hours as well as raise the rigidity of the unit.

A first aspect of the present invention provides a power unit structure (for example, the power unit structure 1 described later) for an electrically driven vehicle (for example, the electrically driven vehicle 9 described later), including: an electric motor unit (for example, the electric motor unit 2 described later) consisting of a central case (for example, the central case 21 described later), an electric motor case (for example, the electric motor case 22 described later) which houses an electric motor (for example, the electric motor 221 described later) mounted on one side of the central case, and a transmission case (for example, the transmission case 23 described later) which houses a transmission (for example, the transmission 231 described later) mounted at another side of the central case; and a control device unit (for example, the control device unit 3 described later) which controls the electric motor, in which the control device unit includes: a first mounting part (for example, the first mounting part 31 described later) which is a mounting part of a power supply unit that supplies electric power to the electric motor, and a second mounting part (for example, the second mounting part 32 described later) which fixes the control device unit to the electric motor unit; and in which the control device unit is mounted from the other side of the electric motor unit towards the one side, the first mounting part is mounted to the central case, and the second mounting part is mounted to the transmission case.

According to the first aspect of the present invention, it is possible to decrease the design man-hours, without needing to consider interference with the gears of the transmission, by directly mounting the first mounting part, which is the mounting part of the power supply unit of the control device unit to the electric motor, i.e. electrical fastener, to the central case. In addition, by mounting the second mounting part of the control device unit to the transmission case, it is possible to mount the control device unit to span a plurality of members constituting the electric motor unit, and possible to raise the rigidity of the unit, while suppressing enlargement in the height direction of the unit.

According to a second aspect of the present invention, in the power unit structure for an electrically driven vehicle as described in the first aspect, it is preferable for the control device unit and the transmission case to be disposed so as to overlap each other when viewed from a vertical direction.

According to the second aspect of the present invention, by arranging the control device unit and transmission case so as to overlap each other when viewing from the vertical direction, it is possible to shorten the dimension in the mounting direction upon mounting the control device unit to the electric motor unit, and possible to reduce the size of the power unit structure of the electrically driven vehicle.

According to a third aspect of the present invention, in the power unit structure for an electrically driven vehicle as described in the first or second aspect, it is preferable for the control device unit to consists of a control device (for example, the control device 30 described later) which controls the electric motor, and a bracket (for example, the bracket 320 described later) which supports below the control device, the first mounting part to be formed at the control device, and the second mounting part to be formed at the bracket.

According to the third aspect of the present invention, by forming the second mounting part 32 in the bracket which supports below the control device, after preferentially fastening the first mounting part which ensures electrical connection, it is possible to absorb with the second mounting part any gap for clearance occurring from the configuring mounting the control device unit to span a plurality of members constituting the electric motor unit. In addition, by supporting below the control device by the bracket, it is possible to suppress sound radiation of the control device from vibration transmitted from the side of the electric motor and transmission.

According to a fourth aspect of the present invention, in the power unit structure for an electrically driven vehicle as described in any one of the first to third aspects, it is preferable for the first mounting part and a mounted part (for example, the mounted part 20 described later) of the central case connected to the first mounting part to be disposed so as to run along an upper end (for example, the upper end 10 described later) of the power unit structure for an electrically driven vehicle.

According to the fourth aspect of the present invention, since the first mounting part, which is a mounting part of the power supply unit given mounting priority is arranged so as to run along the upper end of the power unit structure of the electrically driven vehicle, it is possible to assemble the first mounting part during assembly work while visually confirming, and thus possible to suppress erroneous assembly.

In addition, it is possible to suppress wetting from water being heaved up from the vehicle bottom, by arranging above the first mounting part, which is the electrical connection part.

According to a fifth aspect of the present invention, in the power unit structure for an electrically driven vehicle as described in the third or fourth, it is preferable for the bracket to consist of a support part (for example, the support part 321 described later) which supports the control device, and a pair of legs (for example, the pair of legs 322, 322 described later) which extends from the support part towards downwards; and an accessory (for example, the electric oil pump 7 described later) mounted to the electric motor unit to be disposed at a position sandwiched by the pair of legs.

According to the fifth aspect of the present invention, by arranging the accessory at a position sandwiched by the pair of legs which extend from the support part of the bracket downwards, if assembly is performed at the wrong angle upon assembling the first mounting part, which is an electrical connection part, while visually confirming, the legs of the bracket will interfere with the accessory. It is thereby possible to know that assembly is not being performed correctly, and possible to more reliably suppress erroneous assembly. In addition, the accessory positioned between the pair of legs can be protected from impact during collision.

According to a sixth aspect of the present invention, in the power unit structure for an electrically driven vehicle as described in the fifth aspect, it is preferable for the support part of the bracket to be formed in a substantially C-shape which surrounds a center of gravity of the control device when viewing the control device unit from below; and the pair of legs to extend from a position sandwiched by two fixing points (for example, the fixing points 323, 323 described later) of the support part to the control device towards downwards, when viewing from one side in the longitudinal direction of the control device.

According to the sixth aspect of the present invention, by forming the support part of the bracket in a substantially C-shape surrounding the center of gravity of the control device when viewed from below, and forming the pair of legs extending downwards from a position sandwiched by the two fixing points of the support part when viewed from one of the longitudinal directions of the control device, it is possible to stably fix the control device. It is thereby possible to effectively suppress sound radiation of the control device by vibration transmitted from the electric motor and transmission side.

According to a seventh aspect of the present invention, in the power unit structure for an electrically driven vehicle as described in any one of the first to sixth aspects, it is preferable for the control device unit to be disposed vehicle rearward, and to be disposed more vehicle forward than the electric motor unit.

According to the seventh aspect of the present invention, by arranging the control device unit more vehicle forward than the electric motor unit, it is possible to accept the load during rear collision by the electric motor unit, which is a rigid body made of metal, and thus possible to protect the control device unit.

According to an eighth aspect of the present invention, in the power unit structure for an electrically driven vehicle as described in the seventh aspect, it is preferable for the control device to have a connection part (for example, the connection part 33 described later), to which a diagnostic device for the control device is connected, formed at a rear end face which is vehicle rearward.

According to the eighth aspect of the present invention, by forming, at the rear end face of the vehicle rear, the connection part to which diagnostic equipment of the control device is connected, it becomes possible to diagnose by simply removing the bumper without unloading units for the electrically driven vehicle from the vehicle during fault diagnosis in service, and thus it is possible to decrease the service workload.

According to the present invention, it is possible to provide a power unit structure for an electrically driven vehicle which can decrease design man-hours as well as raise the rigidity of the unit.

BRIEF DESCRIPTION OF THE DRAWINGS

FIG. 2 is a view looking from vehicle rearward at the power unit structure for an electrically driven vehicle according to an embodiment of the present invention;

DETAILED DESCRIPTION OF THE INVENTION

Figure 1:
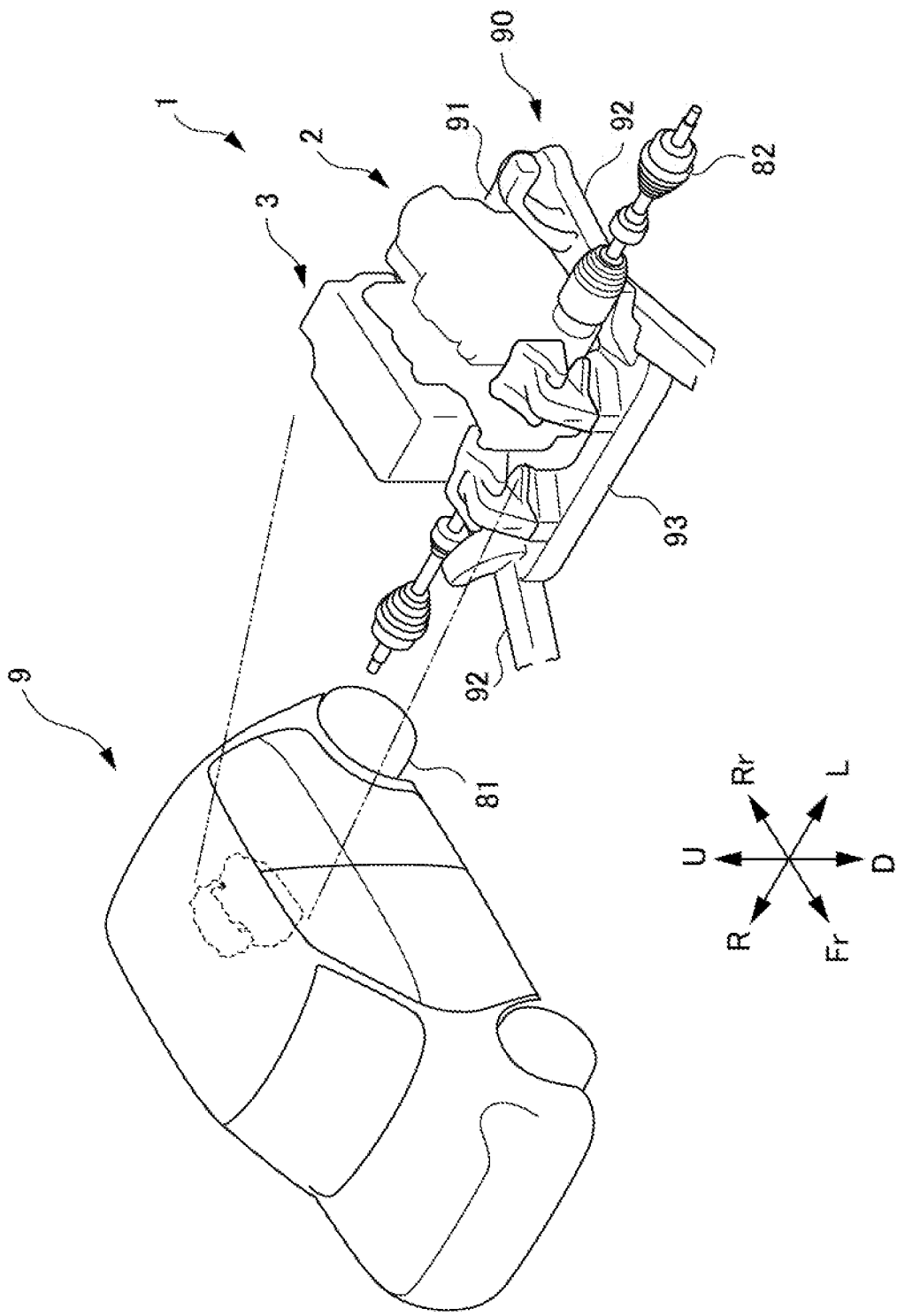
FIG. 1 is a perspective view showing the arrangement and outline configuration of a power unit structure for an electrically driven vehicle according to an embodiment of the present invention.

Hereinafter, an embodiment of the present invention will be explained in detail while referencing the drawings. It should be noted that, in the drawings, the U direction is up, D direction is down, Fr direction is vehicle forward, Rr is vehicle rearward, R direction is the right direction viewing from the driver's seat of the vehicle (vehicle width right side, and L direction is the left direction viewing from the driver's seat of the vehicle (vehicle width left side).

FIG. 1 is a perspective view showing the arrangement and outline configuration of a power unit structure 1 for an electrically driven vehicle 9 according to an embodiment of the present invention. As shown in FIG. 1, the power unit structure 1 for the electrically driven vehicle 9 according to the present embodiment is arranged at vehicle rearward (rear side) of the electrically driven vehicle 9. In addition, the power unit structure 1 for the electrically driven vehicle 9 according to the present embodiment is arranged above a rear frame 90 configuring a vehicle body rear of the electrically driven vehicle 9.

The rear frame 90 is configured from a first rear frame 91, a pair of second rear frames 92, 92, and a third rear frame 93.

The first rear frame 91 extends in the vehicle width direction at the rear part of the vehicle 9. The pair of second rear frames 92, 92 is connected to both ends in the vehicle width direction of the first rear frame 91, and respectively extends from these connection parts towards vehicle forwards. The third rear frame 93 extends in the vehicle width direction so as to connect bridging the vehicle forward side of the pair of second rear frames 92, 92. On the rear frame 90 configured in a substantially rectangular shape by this first rear frame 91, pair of second rear frames 92, 92 and third rear frame 93, the power unit structure 1 for the electrically driven vehicle 9 according to the present embodiment is mounted.

As shown in FIG. 1, the power unit structure 1 for the electrically driven vehicle 9 according to the present embodiment includes an electric motor unit 2, and control device unit 3. The electric motor unit 2 is arranged on the R direction side, and the control device unit 3 is arranged on the L direction side. The electric motor unit 2 is connected to an axle 82 connecting the pair of left and right drive wheels 81, and the control device unit 3 is mounted to this electric motor unit 2.

Figure 3:
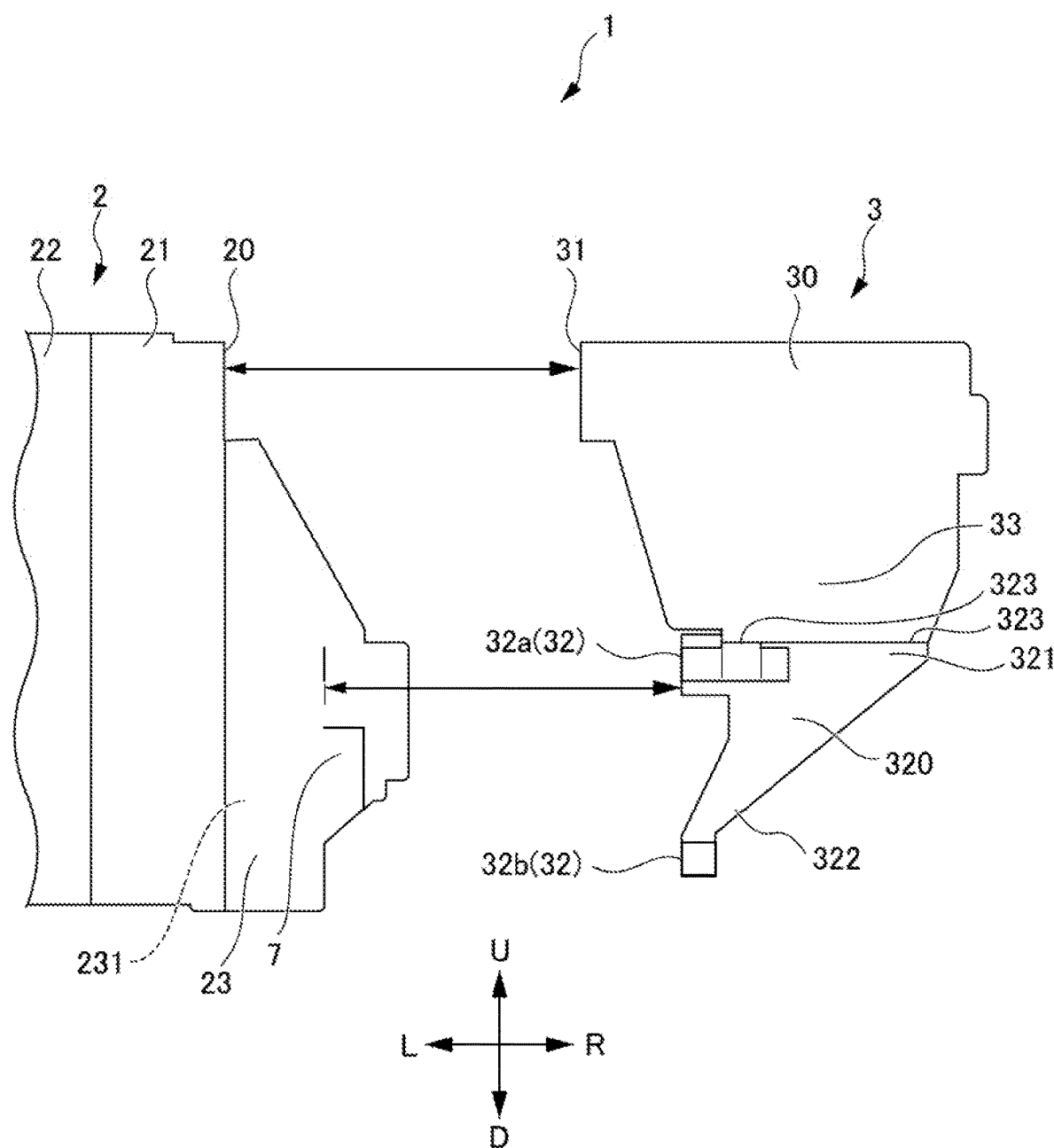
FIG. 3 is a view looking from vehicle rearward at the power unit structure for an electrically driven vehicle according to an embodiment of the present invention, and shows a state when mounting a control device unit to an electric motor unit.
Figure 4:
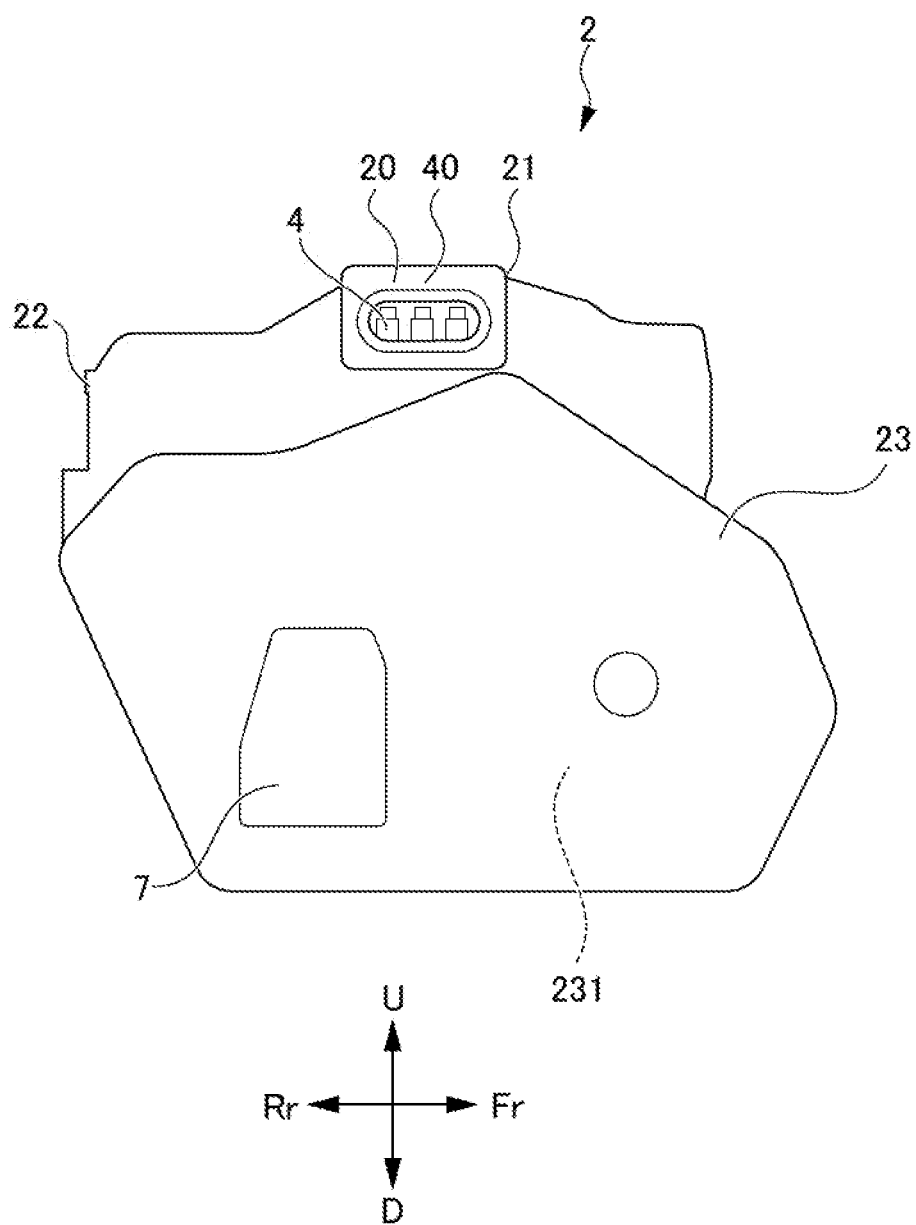
FIG. 4 is a view looking from a vehicle width right side (R direction) at the electric motor unit prior to mounting the control device unit.
Figure 5:
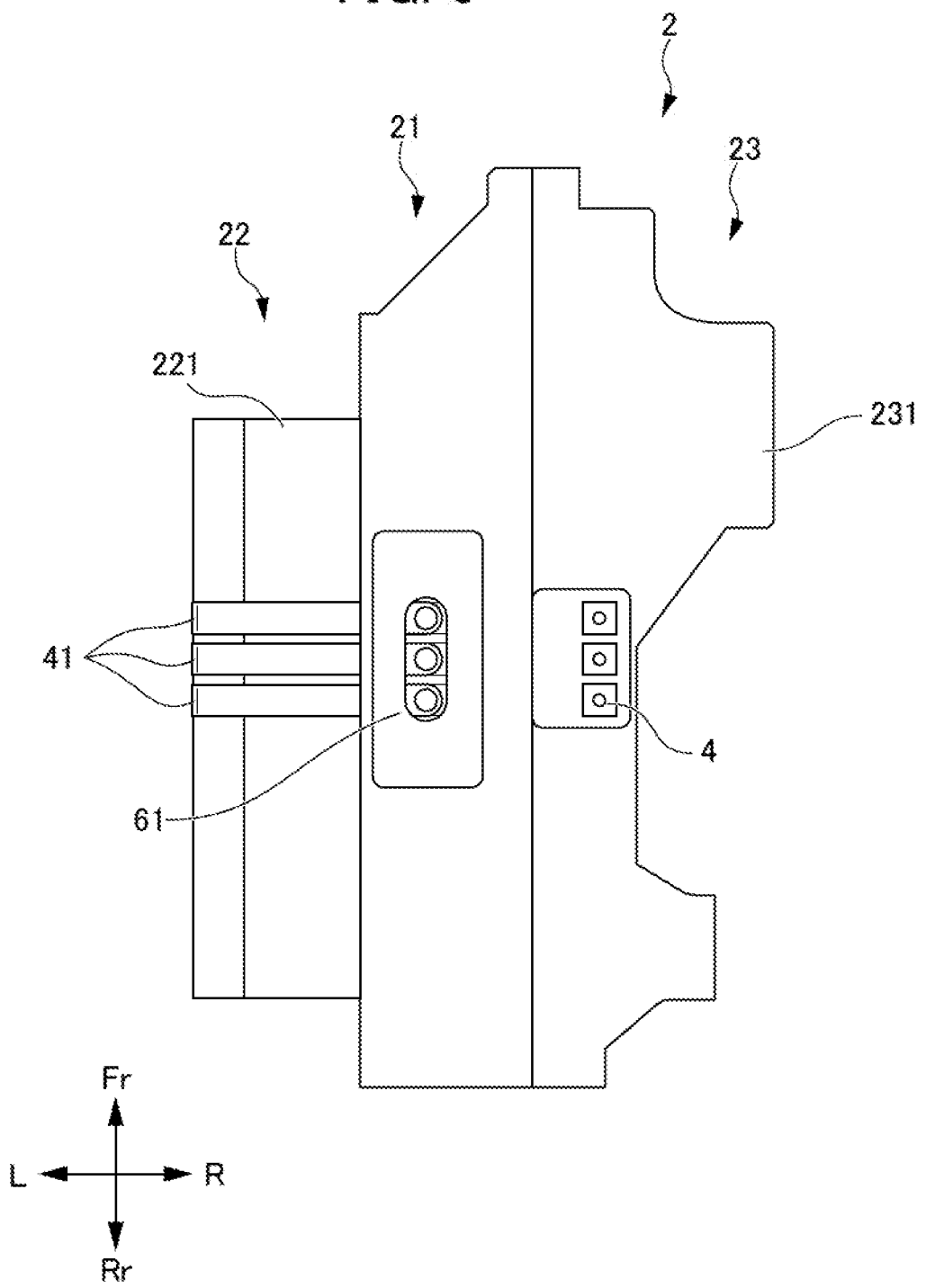
FIG. 5 is a view looking from above at the electric motor unit prior to mounting the control device unit.

FIG. 2 is a view looking from vehicle rearward at the power unit structure 1 for the electrically driven vehicle 9 according to the present embodiment. In addition, FIG. 3 is a view looking from vehicle rearward at the power unit structure 1 for the electrically driven vehicle 9 according to an embodiment of the present invention, and shows a state when mounting the control device unit 3 to the electric motor unit 2. FIG. 4 is a view looking from the R direction at the electric motor unit 2 prior to mounting the control device unit 3. FIG. 5 is a view looking from above at the electric motor unit 2 prior to mounting the control device unit 3. However, FIG. 5 shows a state removing a cover of each case among a center case 21, electric motor case 22 and transmission case 23.

As shown in FIG. 2 and FIG. 3, the electric motor unit 2 is configured from the center case 21, electric motor case 22 and transmission case 23.

The center case 21 is arranged between the electric motor case 22 and transmission case 23 described later. The electric motor case 22 is mounted to one side of the center case 21 (L direction side as shown in FIG. 2, for example), and houses the electric motor 221. The transmission case 23 is mounted to the other side of the center case 21 (R direction side as shown in FIG. 2, for example), and houses the transmission 231.

The control device unit 3 is a control device unit having a control device 30 which controls the electric motor 221, and is a so-called PCU (power control unit). This control device unit 3 is mounted from the R direction side to the L direction side of the electric motor unit 2 by a first mounting part 31 and second mounting part 32.

The first mounting part 31 is a mounting part of a power supply unit which supplies electric power to the electric motor 221. In other words, the first mounting part 31 is an electrical connection part between the control device unit 3 and electric motor unit 2. This first mounting part 31 is formed at an end face on the L direction side at the top of the control device 30 in the power unit structure 1 for the electrically driven vehicle 9 according to the present embodiment.

The second mounting part 32 is a mounting part for fixing the control device unit 3 to the electric motor unit 2. In other words, the second mounting part 32 is a mechanical connection part between the control device unit 3 and electric motor unit 2. This second mounting part 32 is formed at an end face on the L direction side of a bracket 320 described later, in the power unit structure 1 for the electrically driven vehicle 9 according to the present embodiment.

As shown in FIG. 2 and FIG. 3, the control device unit 3 and transmission case 23 are arranged so as to overlap each other when viewed from the vertical direction. In more detail, the transmission case 23 is arranged biasing towards the lower side of the electric motor unit 2, and the control device unit 3 is arranged biasing towards the upper side of the electric motor unit 2. In other words, this control device unit 3 and transmission case 23 have vertical direction positions which are partly displaced, while positions in the vehicle width direction partly overlap each other. The mounting of the first mounting part 31 to the center case 21 and mounting of the second mounting part 32 to the transmission case 23 thereby become possible.

The aforementioned first mounting part 31 is connected to a mounted part 20 of the center case 21, which is connected to the first mounting part 31. In addition, the first mounting part 31 is an electrical connection part between the control device unit 3 and electric motor unit 2 as mentioned above; therefore, the first mounting part 31 and mounted part 20 have a three-phase meeting face 40 of the three-phase power lines (bus bar) 41 of the electric motor 221, as shown in FIG. 4 and FIG. 5. At the inside of this three-phase meeting face 40, three-phase terminals 4 of the three-phase power lines 41 are arranged, and the first mounting part 31 is electrically connected to this three-phase terminal 4. It should be noted that, at the three-phase meeting face 40 of the three-phase power lines 41, a coating agent serving to adhere and seal called FIPG (Formed In Place Gasket) is coated, whereby the sealing property is ensured.

As shown in FIG. 5, the three-phase power lines 41 of the electric motor 221 has one end connected to the electric motor 221, and the other end connected to the aforementioned three-phase terminal 4. On the top face of the center case 21, an observation window 61 is formed, whereby it is configured so that an operator can easily confirm whether or not an electrical connection between the three-phase terminal 4 and first mounting part 31 is being reliably made.

In addition, as shown in FIG. 4 and FIG. 5, the first mounting part 31 is arranged at a substantially central part in the longitudinal direction (vehicle width direction) of the control device 30. Similarly, the mounted part 20 is arranged at a substantially central part in the longitudinal direction (vehicle width direction) of the center case 21. Wetting is further suppressed by the water heaved up from the vehicle bottom, and the water-incursion resistance is further raised.

Next, while explaining the mounting sequence of the power unit structure 1 for the electrically driven vehicle 9 according to the present embodiment, a more detailed structure of the power unit structure 1 will be explained.

Figure 6:
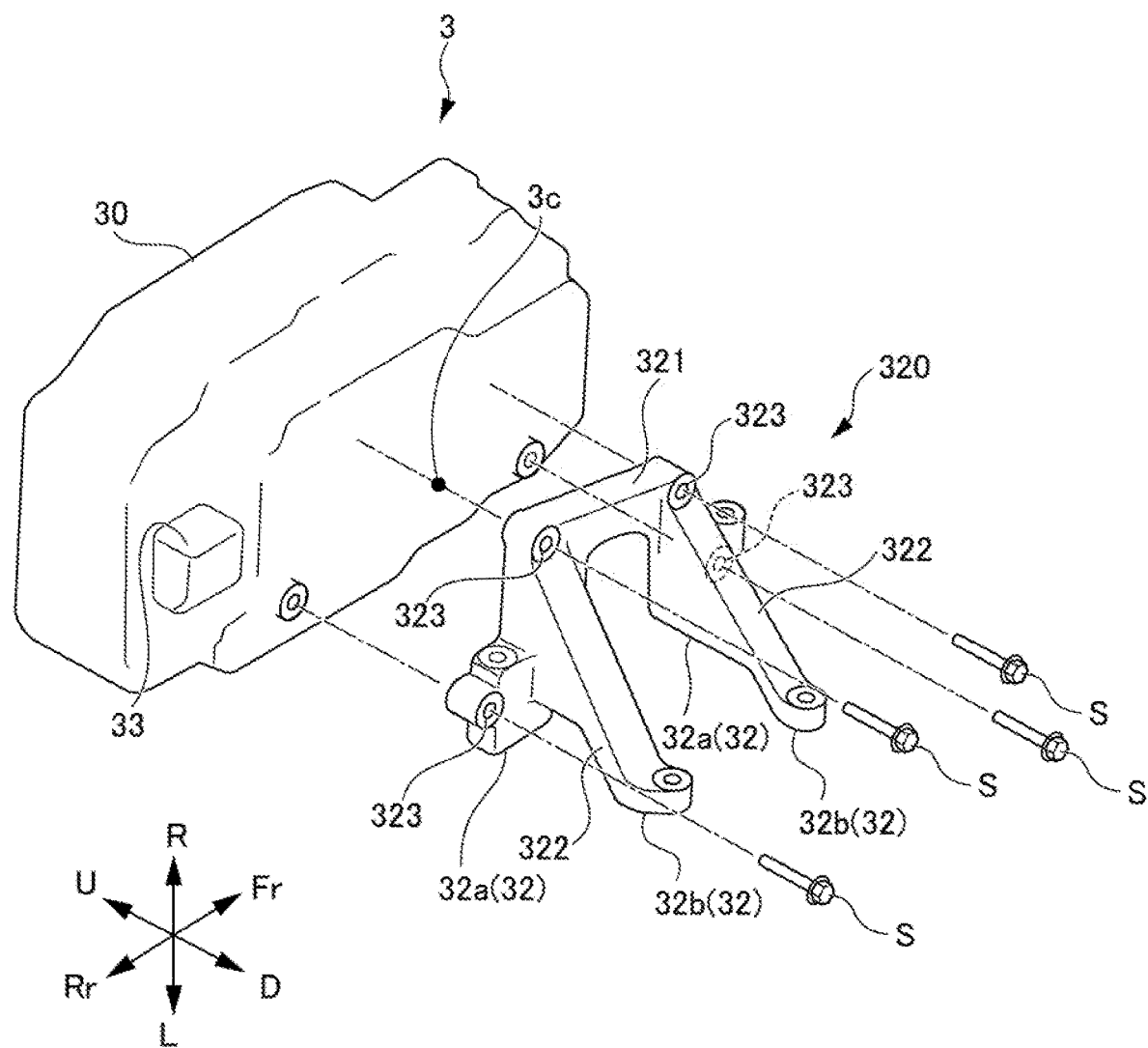
FIG. 6 is a view for explaining a mounting sequence of the power unit structure for an electrically driven according to an embodiment of the present invention, and is a perspective view showing a state when mounting a bracket to the control device unit.
Figure 7:
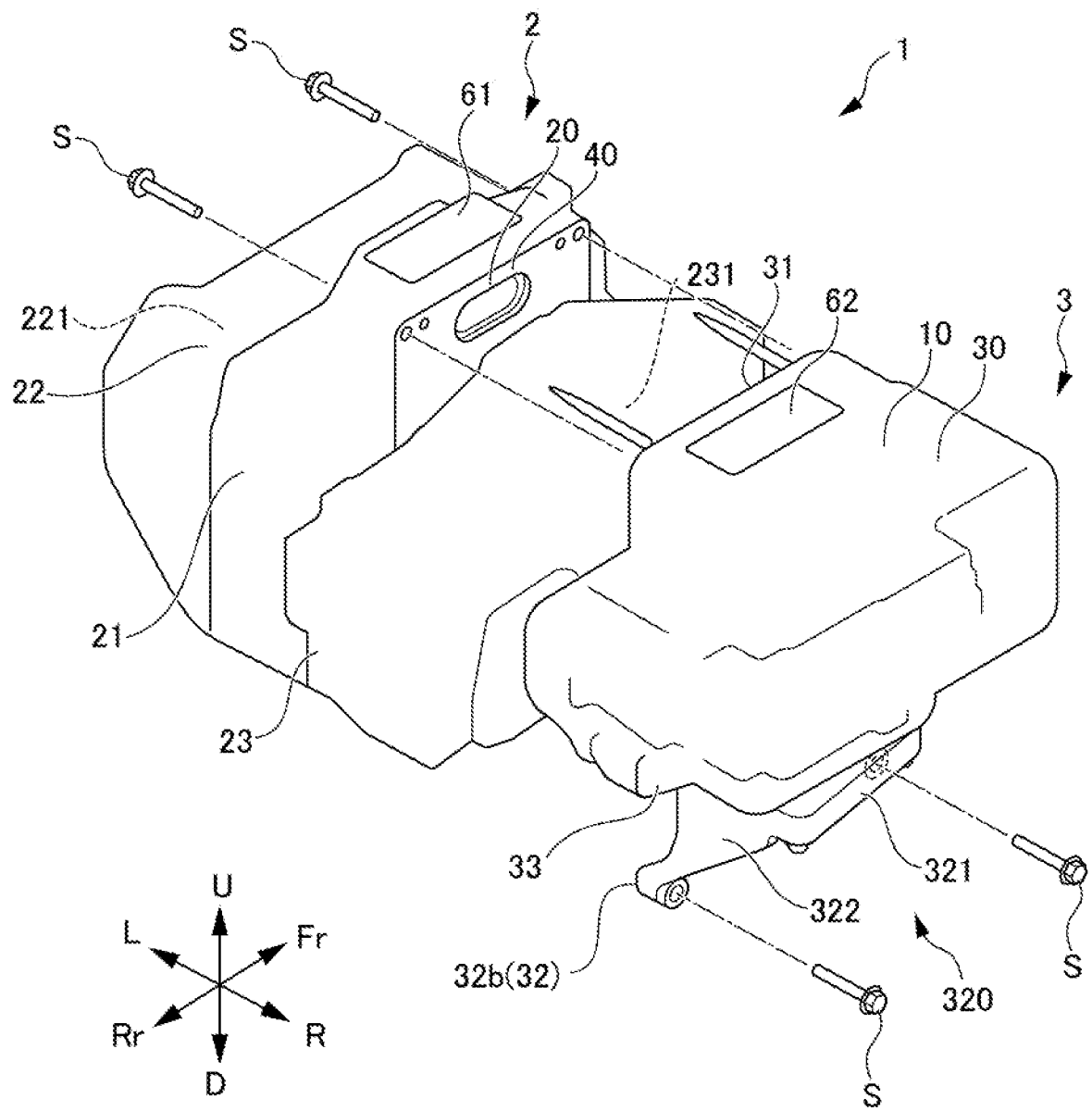
FIG. 7 is a view for explaining a mounting sequence of the power unit structure for an electrically driven according to an embodiment of the present invention, and is a perspective view showing a state when mounting the control device unit to the electric motor unit.
Figure 8:
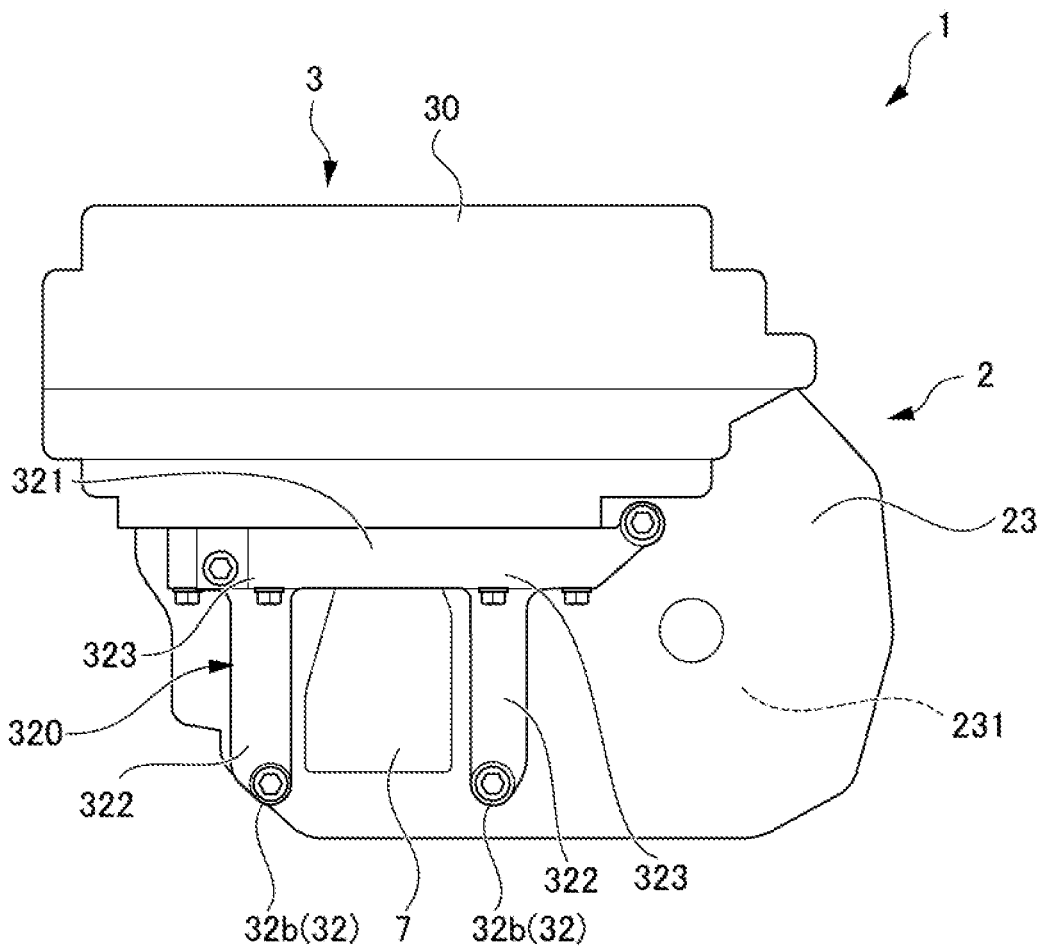
FIG. 8 is a view for explaining a mounting sequence of the power unit structure for an electrically driven vehicle according to an embodiment of the present invention, and is a view looking from a vehicle width right side (R direction) at a state when mounting the control device unit to the electric motor unit.
Figure 9:
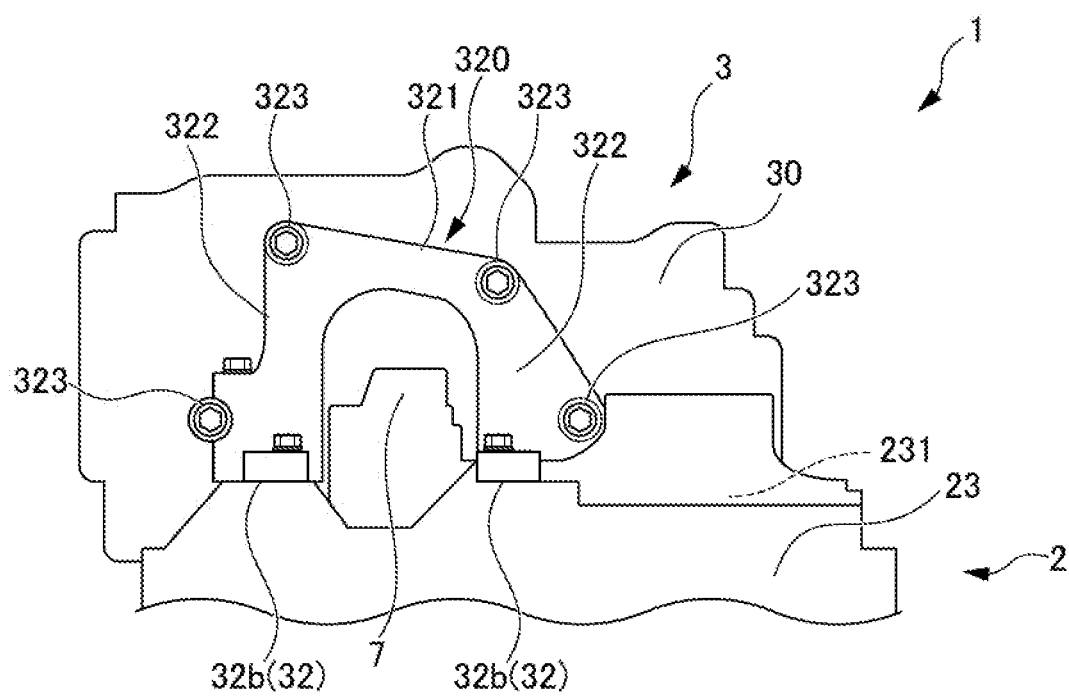
FIG. 9 is a view for explaining a mounting sequence of the power unit structure for an electrically driven vehicle according to an embodiment of the present invention, and is a view looking from below at a state when mounting the control device unit to the electric motor unit.

FIGS. 6 to 9 are views for explaining the mounting sequence of the power unit structure 1 for the electrically driven vehicle 9 according to the present embodiment. More specifically, FIG. 6 is a perspective view showing a state when mounting the bracket 320 to the control device unit 3. FIG. 7 is a perspective view showing a state when mounting the control device unit 3 to the electric motor unit 2. FIG. 8 is a view looking from the R direction at a state when mounting the control device unit 3 to the electric motor unit 2. FIG. 9 is a view looking from the D direction at a state when mounting the control device unit 3 to the electric motor unit 2.

As shown in FIG. 6, the second mounting part 32 is formed in the bracket 320 which supports below the control device 30. The bracket 320 consists of a support part 321 which supports the control device 30, and a pair of legs 322, 322 which extends from the support part 321 downwards.

The support part 321 of the bracket 320 is formed in a substantially C-shape so as to surround the center of gravity 3*c* of the control device 30, when viewing the control device unit 3 from the D direction (downwards). This support part 321 is mounted to the lower face of the control device unit 3 by configuring so that the open side thereof faces the L direction.

In addition, the pair of legs 322, 322, when viewing from one of the longitudinal directions (vehicle width direction) of the control device 30, extends towards the D direction (downwards) from a position sandwiched by the two fixing points 323, 323 of the support part relative to the control device 30 (refer to FIGS. 2 and 3). In more detail, the pair of legs 322, 322 is formed so as to slope downwards as approaching from one end side in the vehicle width direction of the support part 321 (R direction side) to the other end side (L direction side).

The second mounting part 32 is configured by second mounting sections 32*a*, 32*a* formed at an end face in the L direction side of the support part 321, and second mounting sections 32*b*, 32*b* formed at the leading end face (lower end) of the pair of legs 322, 322. The control device unit 3 is mechanically connected to the transmission case 23 via the bracket 320 by way of these second mounting parts 32.

First, as shown in FIG. 6, the bracket 320 is provisionally fixed to the lower surface of the control device unit 3 by temporarily tightening screws S. At this time, the bracket 320 is temporarily fixed to the control device unit 3 in a movable state in the mounting direction of the control device unit 3 to the motor unit 2.

Next, as shown in FIG. 7, the control device unit 3 to which the bracket 320 was temporarily fixed at the lower surface is mounted to the side face of the electric motor unit 2 from the R direction side towards the L direction side. More specifically, first, the first mounting part 31 is securely mounted to the mounted part 20 of the central case 21. At this time, since the first mounting part 31 and mounted part 20 are arranged so as to run along the upper end 10 of the power unit structure 1 of the electrically driven vehicle 9 as shown in FIG. 7, it becomes possible for the operator to easily perform confirmation as to whether or not electrical connected between the first mounting part 31 and mounted part 20 is reliably made by way of the observation window 61 formed on the top of the electric motor unit 2, and the observation window 62 formed on the top of the control device unit 3.

Next, after it is confirmed that electrical connection of the first mounting part 31 was reliably made, the second mounting sections 32*a*, 32*a*, 32*b*, 32*b* of the bracket 320 are mounted to the mounting surface on the side face of the transmission case 23. At this time, in the case of there being no clearance between the mounting surface of the transmission case 23 and the mounting surface of the second mounting sections 32*a*, 32*a*, 32*b*, 32*b*, after moving the bracket 320 in the opposite direction from the mounting direction, and the screw fixing the second mounting sections 32*a*, 32*a*, 32*b*, 32*b*, the screws of the bracket 320 which had been temporarily fastened to the control device unit 3 are final tightened. On the other hand, in the case of having clearance between the mounting surface of the transmission case 23 and mounting surface of the second mounting sections 32*a*, 32*a*, 32*b*, 32*b*, after moving the bracket 320 in the mounting direction to abut the mounting surface of the transmission case 23, and then screw fixing the second mounting sections 32*a*, 32*a*, 32*b*, 32*b*, the screws of the bracket 320 which had been temporarily fastened to the control device unit 3 are final tightened.

Mounting of the control device unit 3 to the electric motor unit 2 is thereby completed. At this time, as shown in FIGS. 8 and 9, it is configured so that the electric oil pump 7 serving as an accessory mounted to the electric motor unit 2 is arranged at a position sandwiched by the pair of legs 322, 322. In other words, the electric oil pump 7 functions as a positioning member of the control device unit 3 relative to the electric motor unit 2. Therefore, in the case of the position of the control device unit 3 relative to the electric motor unit 2 being shifted from prescribed, since the leg 322 of the bracket 320 would interfere with the electric oil pump 7, erroneous assembly becomes suppressible.

Figure 10:
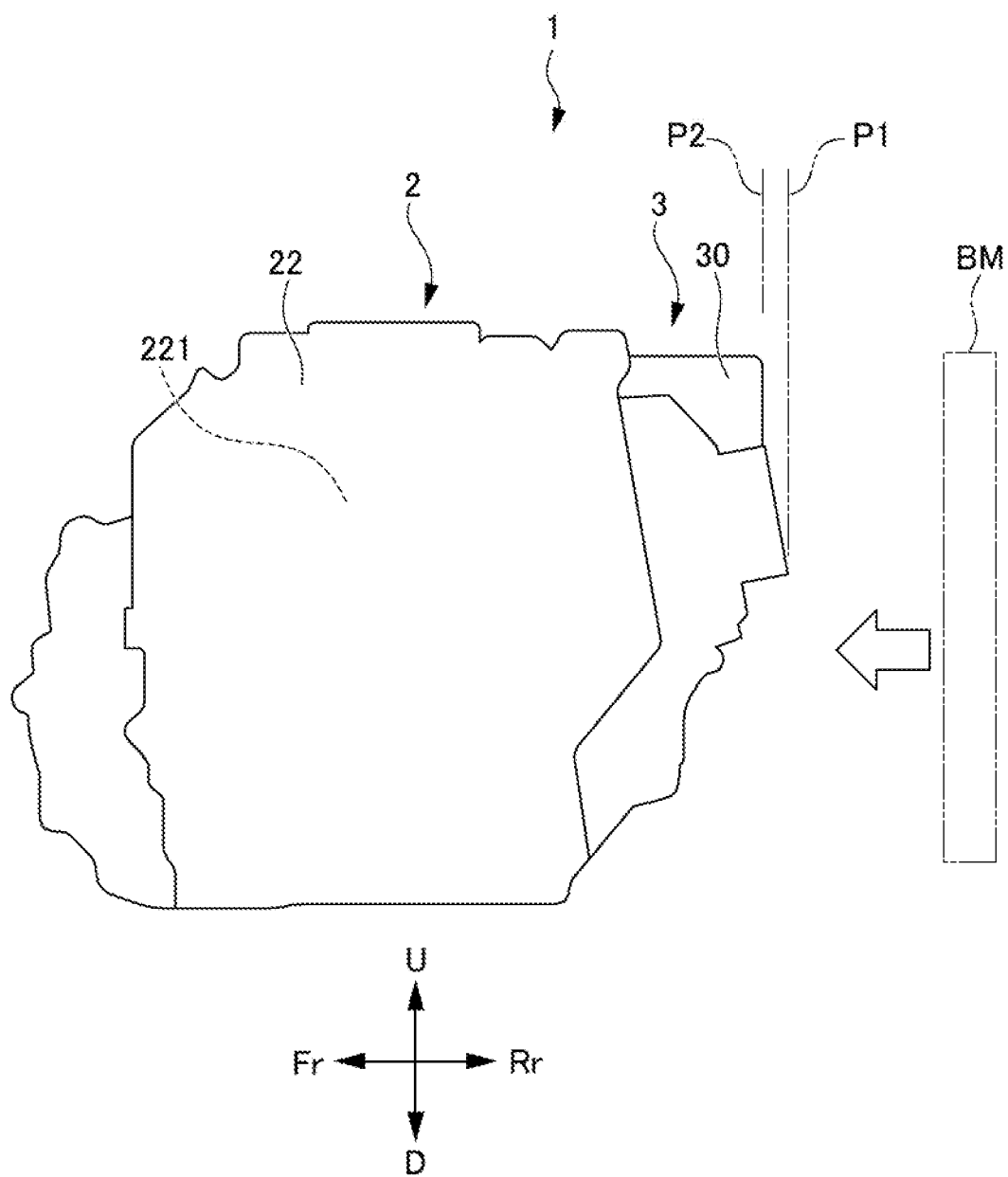
FIG. 10 is a view looking from an L direction (vehicle width left side) at the power unit structure for an electrically driven vehicle according to an embodiment of the present invention.

Next, FIG. 10 is a view looking from the L direction (vehicle width left side) at the power unit structure 1 of the electrically driven vehicle 9 according to the present embodiment. As shown in FIG. 10, the control device unit 3 is arranged more to the Fr direction side than the electric motor unit 2. In more detail, the position P2 of the Rr direction-side end face of the control device unit 3 (control device 30) is positioned more to the Fr direction side than the position P1 of the Rr direction-side end face of the electric motor unit 2. The electric motor unit 2 preferentially receives the shock relative to the body member BM, which receives shock during collision from behind (rear collision) to deform and offset. For this reason, it is configured so that shock to the control device unit 3 is mitigated.

Figure 11:
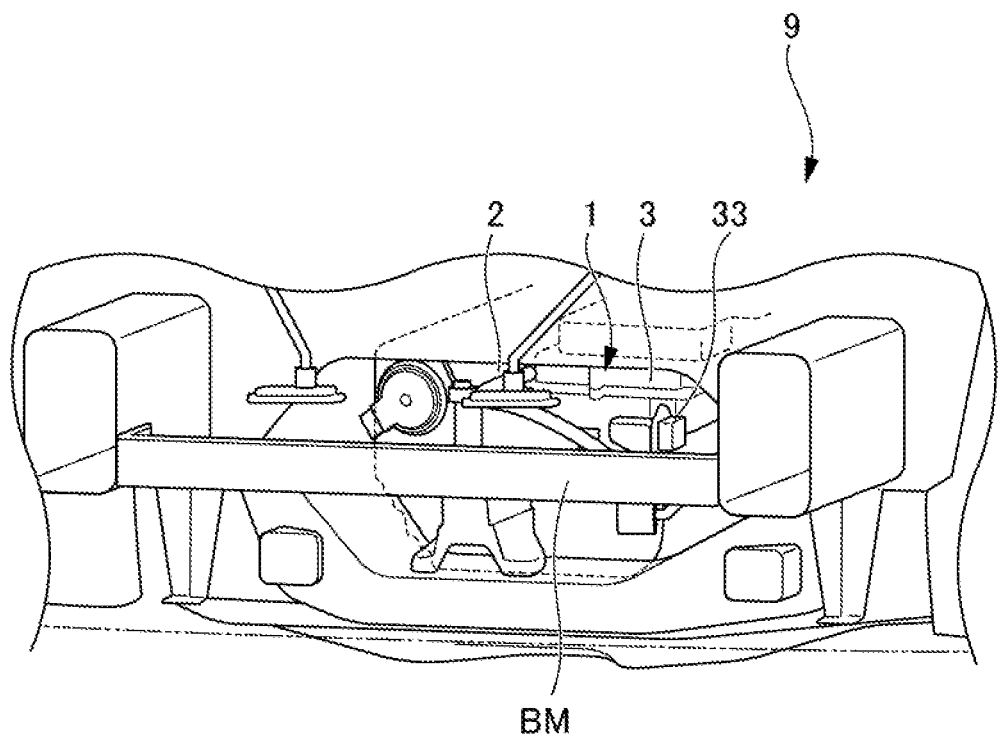
FIG. 11 is a perspective view when looking from behind at the vehicle to which the power unit structure for an electrically driven vehicle according to an embodiment of the present invention was equipped.

In addition, FIG. 11 is a perspective view when looking from behind at the vehicle 9 to which the power unit structure 1 of the electrically driven vehicle 9 according to the present embodiment is equipped. It should be noted that FIG. 11 shows a state removing the rear bumper of the vehicle 9. As shown in FIG. 11, in the control device unit 3, the connection part 33 to which diagnostic equipment (not shown) of the control device 30 is connected, is formed at the Rr direction-side end face. Diagnosis becomes possible by simply removing the rear bumper, without unloading the power unit structure 1 of the electrically driven vehicle 9 from the vehicle 9 during fault diagnosis in service.

According to the power unit structure 1 of the electrically driven vehicle 9 according to the present embodiment equipped with the above configuration, the following effects are exerted. First, according to the present embodiment, it is possible to decrease the design man-hours, without needing to consider interference with the gears of the transmission 231, by directly mounting the first mounting part 31, which is the mounting part of the power supply unit of the control device unit 3 to the electric motor 221, i.e. electrical fastener, to the central case 21. In addition, by mounting the second mounting part 32 of the control device unit 3 to the transmission case 23, it is possible to mount the control device unit 3 to span a plurality of members constituting the electric motor unit 2 (more specifically, central case 21 and transmission case 23), and possible to raise the rigidity of the unit, while suppressing enlargement in the height direction of the unit.

In addition, according to the present embodiment, by arranging the control device unit 3 and transmission case 23 so as to overlap each other when viewing from the vertical direction, it is possible to shorten the dimension in the mounting direction upon mounting the control device unit 3 to the electric motor unit 2, and possible to reduce the size of the power unit structure 1 of the electrically driven vehicle 9.

In addition, according to the present embodiment, by forming the second mounting part 32 in the bracket 320 which supports below the control device 30, after preferentially fastening the first mounting part 31 which ensures electrical connection, it is possible to absorb with the second mounting part 32 any gap for clearance occurring from the configuring mounting the control device unit 3 to span a plurality of members constituting the electric motor unit 2. In addition, by supporting below the control device 30 by the bracket 320, it is possible to suppress sound radiation of the control device 30 from vibration transmitted from the side of the electric motor 221 and transmission 231.

In addition, according to the present embodiment, since the first mounting part 31, which is a mounting part of the power supply unit given mounting priority is arranged so as to run along the upper end 10 of the power unit structure 1 of the electrically driven vehicle 9, it is possible to assemble the first mounting part 31 during assembly work while visually confirming, and thus possible to suppress erroneous assembly. In addition, it is possible to suppress wetting from water being heaved up from the vehicle bottom, by arranging above the first mounting part 31, which is the electrical connection part.

In addition, according to the present embodiment, by arranging the electric oil pump 7 serving as an accessory at a position sandwiched by the pair of legs 322, 322 which extend from the support part 321 of the bracket 320 downwards, if assembly is performed at the wrong angle upon assembling the first mounting part 31, which is an electrical connection part, while visually confirming, the legs 322 of the bracket 320 will interfere with the electric oil pump 7. It is thereby possible to know that assembly is not being performed correctly, and possible to more reliably suppress erroneous assembly. In addition, the electric oil pump 7 positioned between the pair of legs 322, 322 can be protected from impact during collision.

In addition, according to the present embodiment, by forming the support part 321 of the bracket 320 in a substantially C-shape surrounding the center of gravity of the control device 30 when viewed from below, and forming the pair of legs 322, 322 extending downwards from a position sandwiched by the two fixing points 323, 323 of the support part 321 when viewed from one of the longitudinal directions (vehicle width direction) of the control device 30, it is possible to stably fix the control device 30. It is thereby possible to effectively suppress sound radiation of the control device 30 by vibration transmitted from the electric motor 221 and transmission 231 side.

In addition, according to the present embodiment, by arranging the control device unit 3 more vehicle forward than the electric motor unit 2, it is possible to accept the load during rear collision by the electric motor unit 2, which is a rigid body made of metal, and thus possible to protect the control device unit 3.

In addition, according to the present embodiment, by forming, at the rear end face of the vehicle rear, the connection part 33 to which diagnostic equipment of the control device 30 is connected, it becomes possible to diagnose by simply removing the bumper without unloading the power unit structure 1 of the electrically driven vehicle 9 from the vehicle 9 during fault diagnosis in service, and thus it is possible to decrease the service workload.

It should be noted that the present invention is not to be limited to the above-mentioned embodiment, and that modifications and improvements within a scope capable of achieving the object of the present invention are included in the present invention.

EXPLANATION OF REFERENCE NUMERALS 1 power unit structure of electrically driven vehicle
2 electric motor unit
3 control device unit
4 three-phase terminal
7 electric oil pump (accessory)
9 electrically driven vehicle
10 upper end
20 mounted part
21 central case
22 electric motor case
23 transmission case
30 control device
31 first mounting part
32, 32a, 32b second mounting part
33 connection part
40 three-phase meeting face
41 three-phase power line
61, 62 observation window
81 drive wheel
82 axle
90 rear frame
91 first rear frame
92 second rear frame
93 third rear frame
221 electric motor
231 transmission
320 bracket
321 support part
322 leg
323 fixing point
BM body member
S screw

What is claimed is:
1. A power unit structure for an electrically driven vehicle, comprising:
 an electric motor unit consisting of a central case, an electric motor case which houses an electric motor mounted on one side of the central case, and a transmission case which houses a transmission mounted at another side of the central case; and
 a control device unit which controls the electric motor, wherein the control device unit includes:

a first mounting part which is a mounting part of a power supply unit that supplies electric power to the electric motor, and a second mounting part which fixes the control device unit to the electric motor unit; and wherein the control device unit is mounted from the other side of the electric motor unit towards the one side, the first mounting part is mounted to the central case, and the second mounting part is mounted to the transmission case.

2. The power unit structure for an electrically driven vehicle according to claim 1, wherein the control device unit and the transmission case are disposed so as to overlap each other when viewed from a vertical direction.

3. The power unit structure for an electrically driven vehicle according to claim 1, wherein the control device unit consists of a control device which controls the electric motor, and a bracket which supports below the control device, wherein the first mounting part is formed at the control device, and wherein the second mounting part is formed at the bracket.

4. The power unit structure for an electrically driven vehicle according to claim 3, wherein the first mounting part and a mounted part of the central case connected to the first mounting part are disposed so as to run along an upper end of the power unit structure for an electrically driven vehicle.

5. The power unit structure for an electrically driven vehicle according to claim 3, wherein the bracket consists of a support part which supports the control device, and a pair of legs which extends from the support part towards downwards, and wherein an accessory mounted to the electric motor unit is disposed at a position sandwiched by the pair of legs.

6. The power unit structure for an electrically driven vehicle according to claim 5, wherein the support part of the bracket is formed in a substantially C-shape which surrounds a center of gravity of the control device when viewing the control device unit from below, and wherein the pair of legs extends from a position sandwiched by two fixing points of the support part to the control device towards downwards, when viewing from one side in the longitudinal direction of the control device.

7. The power unit structure for an electrically driven vehicle according to claim 3, wherein the control device unit is disposed vehicle rearward, and is disposed more vehicle forward than the electric motor unit.

8. The power unit structure for an electrically driven vehicle according to claim 7, wherein the control device has a connection part, to which a diagnostic device for the control device is connected, formed at a rear end face which is vehicle rearward.

* * * * *